United States Patent
Hanson et al.

(10) Patent No.: US 8,218,743 B2
(45) Date of Patent: Jul. 10, 2012

(54) METHOD AND APPARATUS FOR CONNECTING A CALLER PREVIOUSLY DIVERTED TO VOICEMAIL

(75) Inventors: Karrie Jo Hanson, Westfield, NJ (US); Donnie Henderson, Manalapan, NJ (US); Thomas M. Smith, Westfield, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1385 days.

(21) Appl. No.: 11/507,687

(22) Filed: Aug. 22, 2006

(65) Prior Publication Data
US 2008/0049911 A1    Feb. 28, 2008

(51) Int. Cl.
*H04M 15/06* (2006.01)
(52) U.S. Cl. .......... 379/142.01; 379/88.25; 379/211.02
(58) Field of Classification Search .......... 455/458–459, 455/412.1; 379/68–88.28, 211.02, 142.01
See application file for complete search history.

(56) References Cited

U.S. PATENT DOCUMENTS

| | | | |
|---|---|---|---|
| 5,151,929 A | | 9/1992 | Wolf |
| 5,706,329 A | * | 1/1998 | Foladare et al. .......... 455/459 |
| 5,864,606 A | * | 1/1999 | Hanson et al. .......... 379/88.18 |
| 6,169,795 B1 | * | 1/2001 | Dunn et al. .......... 379/209.01 |
| 6,337,898 B1 | * | 1/2002 | Gordon .......... 379/67.1 |
| 6,453,023 B1 | * | 9/2002 | McKee .......... 379/88.25 |
| 7,143,168 B1 | * | 11/2006 | DiBiasio et al. .......... 709/226 |
| 7,254,221 B2 | * | 8/2007 | Koch .......... 379/88.21 |
| 7,433,680 B2 | * | 10/2008 | Jenkins et al. .......... 455/412.1 |
| 7,769,146 B1 | * | 8/2010 | Weaver et al. .......... 379/88.17 |
| 2004/0096046 A1 | * | 5/2004 | Lection et al. .......... 379/142.06 |
| 2004/0258220 A1 | * | 12/2004 | Levine et al. .......... 379/88.23 |
| 2006/0046698 A1 | | 3/2006 | O'Brien |
| 2006/0264205 A1 | * | 11/2006 | Gibbs .......... 455/413 |
| 2007/0041518 A1 | * | 2/2007 | Silver et al. .......... 379/67.1 |

FOREIGN PATENT DOCUMENTS

WO    WO 00/39990    7/2000

OTHER PUBLICATIONS

PCT International Search Report corresponding to PCT Patent Application PCT/US2007/018126 filed Aug. 15, 2007 (3 pages).
PCT Written Opinion of the International Searching Authority corresponding to PCT Patent Application PCT/US2007/018126 filed Aug. 15, 2007 (6 pages).

* cited by examiner

*Primary Examiner* — Simon Sing
*Assistant Examiner* — Assad Mohammed

(57) ABSTRACT

Disclosed is a method and apparatus for enabling communication between a first party and a second party. The method and apparatus determine that the second party is calling the first party while the first party is leaving a message on the voicemail of the second party. The message is then aborted and the first party is connected to the second party.

10 Claims, 5 Drawing Sheets

METHOD AND APPARATUS FOR CONNECTING A CALLER PREVIOUSLY DIVERTED TO VOICEMAIL

BACKGROUND OF THE INVENTION

The present invention relates generally to telephony and more specifically to enabling direct communication between two parties after one party has been diverted to voicemail.

When a first individual calls a second individual and the second individual does not answer the telephone within a predetermined amount of time, the first individual is typically connected to the second individual's voicemail. Such diversion of a call to voicemail may occur, for example, when the second individual is not present to answer his or her telephone. Alternatively, the second individual may have difficulty locating his or her wireless telephone before the first individual is connected to voicemail.

While the first individual is leaving a message on the second individual's voicemail, the second individual may then become available to talk to the first individual. For example, the second individual may walk into his or her home while the first individual is leaving a voicemail message on the second individual's voicemail. As a second example, the second individual may locate his or her wireless telephone while the first individual is leaving a voicemail message on the second individual's voicemail. As a third example, the second individual may receive a call from the first individual while on another call. The second individual may look at the caller identification information (e.g., displayed by a call waiting service) and decide, at that time, not to take the new call.

In any of these examples, if the second individual determines (e.g., with caller identification) that the first individual called the second individual, then the second individual may then call the first individual back while the first individual is leaving a voicemail message on the second individual's voicemail. In a typical modern telephony system, the second individual typically either receives a busy signal or finds himself connected to the first individual's voicemail. This may result in crossed voicemails—the second individual is leaving a voicemail message on the first individual's voicemail while the first individual is simultaneously leaving a voicemail message on the second individual's voicemail.

There remains a need to better handle the situation in which a second individual wants to speak to a first individual after the first individual is already connected to the second individual's voicemail.

BRIEF SUMMARY OF THE INVENTION

In accordance with the principles of the present invention, a node in a telephone network enables communication between a first party and a second party at the same time as the first party is leaving a voicemail with the second party. The node recognizes that the two people are trying to reach each other. Once this determination is made, the node aborts the voicemail message and directly connects the first party with the second party. In one embodiment, the node provides a notification (e.g., a personalized announcement) that it is connecting the two parties.

In one embodiment, the node stores information associated with the first or second party, such as the party's telephone number, in memory or in a database. The node can then compare the stored information to information obtained when the second party calls the first party. If there is a match, then the node has determined that the second party is calling the first party (i.e., the party that just previously called the second party and is leaving a voicemail message). The node then aborts the voicemail message being left and connects the first party with the second party. In one embodiment, the node erases the voicemail message(s). In one embodiment, all calls to or from the second party traverse through the node.

These and other advantages of the invention will be apparent to those of ordinary skill in the art by reference to the following detailed description and the accompanying drawings.

DETAILED DESCRIPTION

Figure 1A:
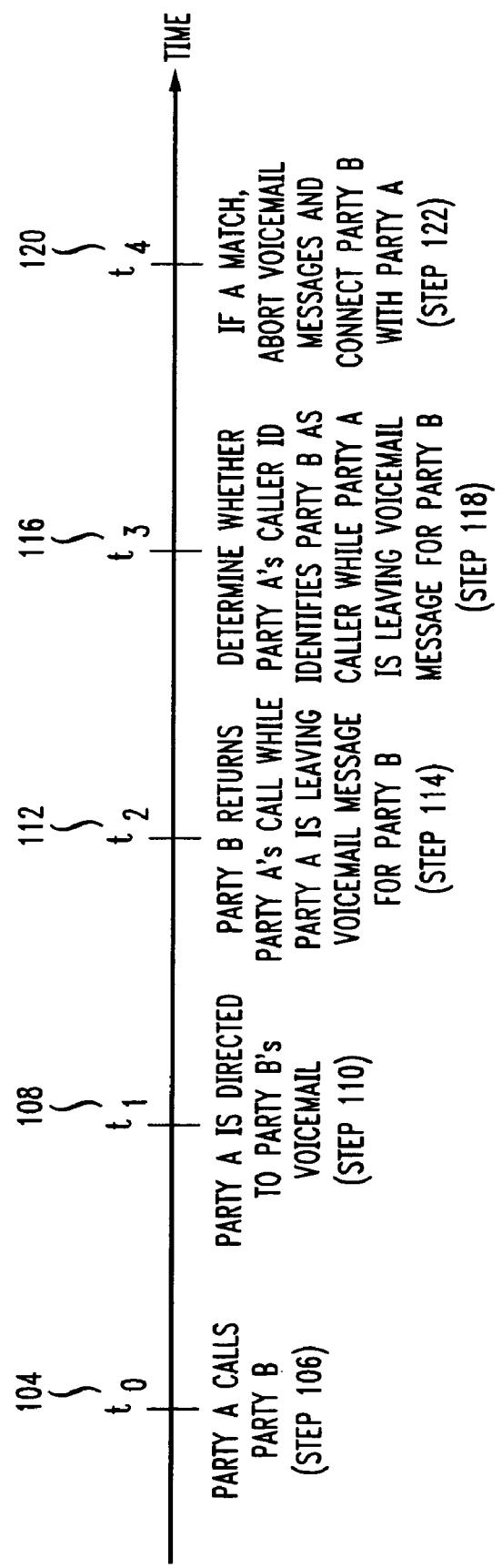
FIG. 1A is a timing diagram of the steps performed to connect a first party who has been previously diverted to a second party's voicemail to the second party.

FIG. 1A is a timing diagram of the steps performed to connect a second party to a first party who has been previously diverted to voicemail. The first party (i.e., party A) places a call to the second party (i.e., party B) at a time $t_0$ 104 in step 106. Party B does not answer the telephone. This may occur when party B is not home or cannot locate party B's wireless telephone in time to answer the telephone call. As a result, party A is diverted to party B's voicemail at time $t_1$ 108 in step 110. Party A leaves party B a voicemail message on party B's voicemail.

While party A is leaving party B a voicemail message, party B may become available to return party A's telephone call. Party B becomes available to return party A's call by, for example, coming home and determining that party A just called or by locating party B's wireless telephone and determining that party A just called. In one embodiment, party B uses caller identification (i.e., caller ID) (or any other type of call identifier) to determine that party A just called.

Party B tries to return party A's call but party A is leaving a voicemail message for party B at that time ($t_2$ 112) in step 114. Party B may be directed to party A's voicemail or may receive a busy signal because party A is leaving a voicemail message for party B on party B's voicemail. Party A's telephone uses caller ID to identify the caller as party B. At this moment, the two parties are unable to connect because party A is leaving a voicemail message for party B.

A node detects that party A and party B are trying to reach each other and takes an action to connect them. The node determines that party A has just called party B and is currently leaving party B a voicemail and party B is currently calling party A back.

If there is a match between the telephone number identified by party A's caller ID and the telephone number that party A just previously called (i.e., party B's telephone number) at time $t_3$ 116 in step 118, then the voicemail message is aborted and party B is connected with party A at time $t_4$ 120 in step 122. If the system didn't detect the condition fast enough, both party A and party B may be leaving voicemail messages for each other. In this case, both messages would be aborted. Alternatively, party B may receive a busy signal when calling party A while party A is leaving party B a message. In one embodiment, each time (e.g., time $t_4$ 120) is extremely close to (e.g., one second after) the previous time (e.g., time $t_3$ 116).

The service of connecting the second party to the first party (i.e., enabling direct (i.e., person to person) communication between the first and second parties over the telephone network) after the first party is diverted to the second party's voicemail can be applied by any telephone network, such as Public Switched Telephone Network (PSTN), wireless, VoIP, etc. In particular, many components within any type of telephone network may provide the capabilities to offer the service of connecting a caller previously diverted to voicemail with another caller.

Figure 1B:
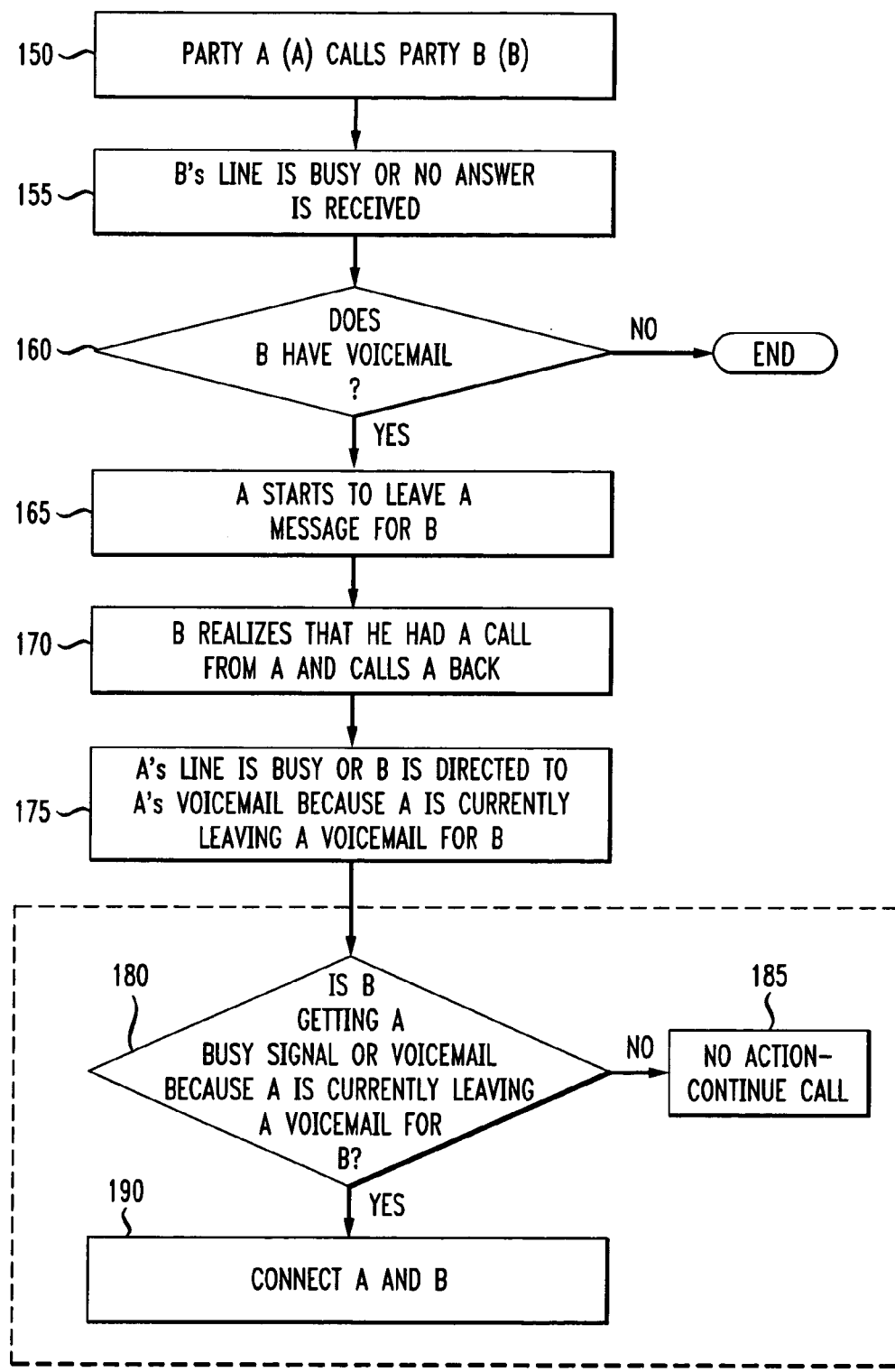
FIG. 1B is a high level flowchart showing the steps performed by a node in accordance with an aspect of the invention to connect party B to party A after party A has been connected to party B's voicemail.

FIG. 1B is a high level flowchart showing the steps performed by a node in accordance with an aspect of the invention to connect party B to party A after party A has been connected to party B's voicemail. First, party A calls party B in step 150. Party B's line is busy or no answer is received in step 155. Party A then determines in step 160 whether Party B has voicemail. If not, then party A ends the call in step 165. If Party B does have voicemail, then party A starts to leave a message for party B in step 165. Party B then realizes that he had a call from party A and calls party A back in step 170. Party A's line is busy or party B is directed to party A's voicemail because party A is currently leaving a voicemail for party B in step 175.

The node then determines whether party B is getting a busy signal or voicemail because party A is currently leaving a voicemail for party B in step 180. If not, then no action is taken and the call continues in step 185. If so, then the node connects party A and party B in step 190. In one embodiment, the node may also provide an announcement to one or both parties that they are being connected. Steps 180-190 are enclosed in a dashed box indicating that these steps are being performed by the node in accordance with an aspect of the present invention.

Figure 2:
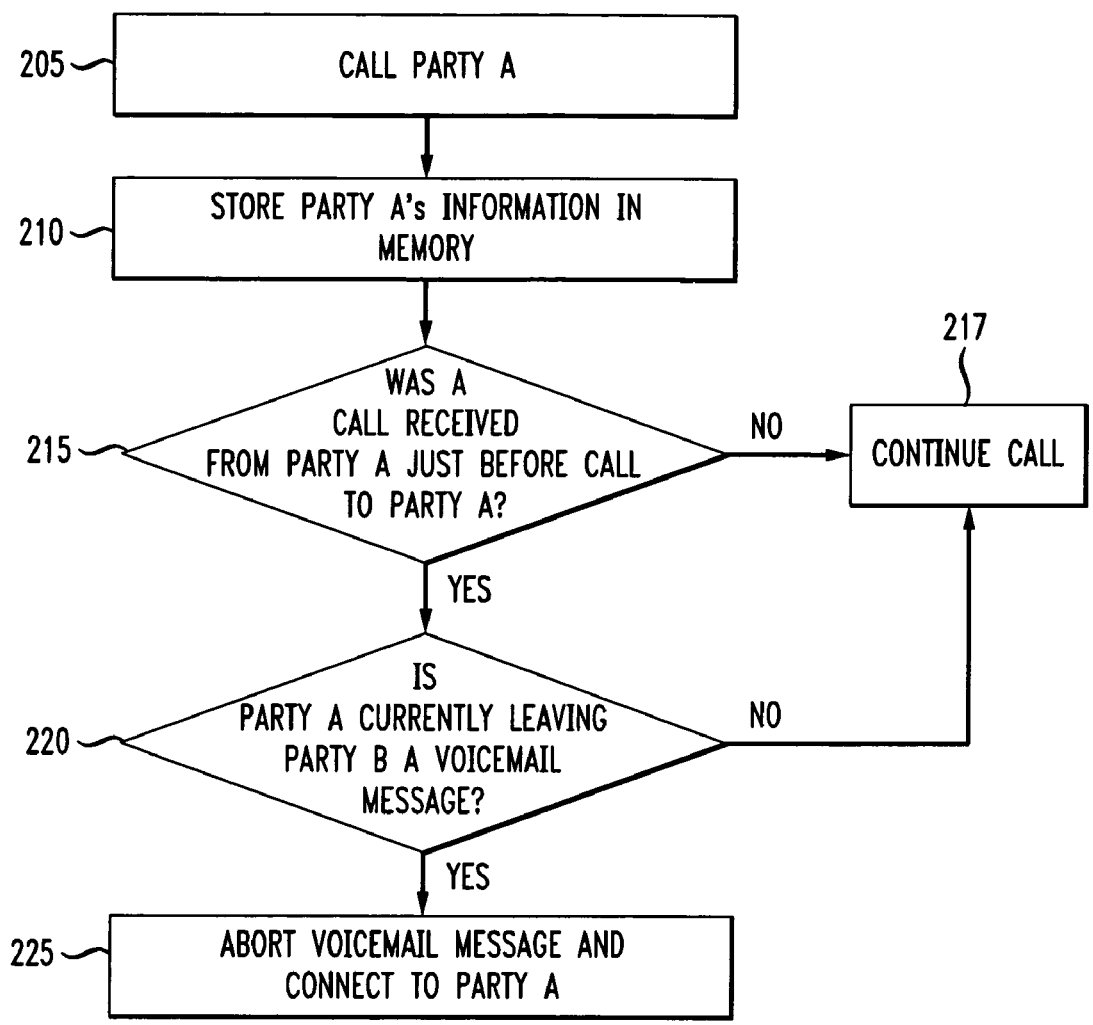
FIG. 2 shows a flowchart of steps performed to connect the second party to the first party after the first party is in the process of leaving a voicemail for the second party in accordance with the present invention.

FIG. 2 shows a flowchart of steps that are performed in accordance with an aspect of this invention to connect party B to party A after party A has been connected to party B's voicemail. FIG. 2 represents the case in which party B is a subscriber to the service described above.

First, party B calls party A in step 205. Party B's telephone service stores party A's information, such as in SIP messaging, memory or a database (e.g., in the memory of a component of the telephony network, such as in an application server's memory in a Voice over Internet Protocol (VOIP) network) in step 210. In step 215, the telephone service provider of party B (i.e., a component or node in the telephone network) determines whether a call was received from party A just before party B made the call to party A in step 205. If not, the call continues in step 217 and party B connects to party A (e.g., connects to party A or connects to party A's voicemail).

If a call was received from party A just prior to party B's call to party A, then party B's telephone service provider determines whether party A is currently leaving party B a voicemail message on party B's voicemail in step 220. If party A is not currently leaving party B a voicemail message, then the call continues in step 217. If, however, party A is currently leaving party B a voicemail message in step 220, then the voicemail message being left by party A is aborted and the call between party A and party B is connected in step 225.

Figure 3:
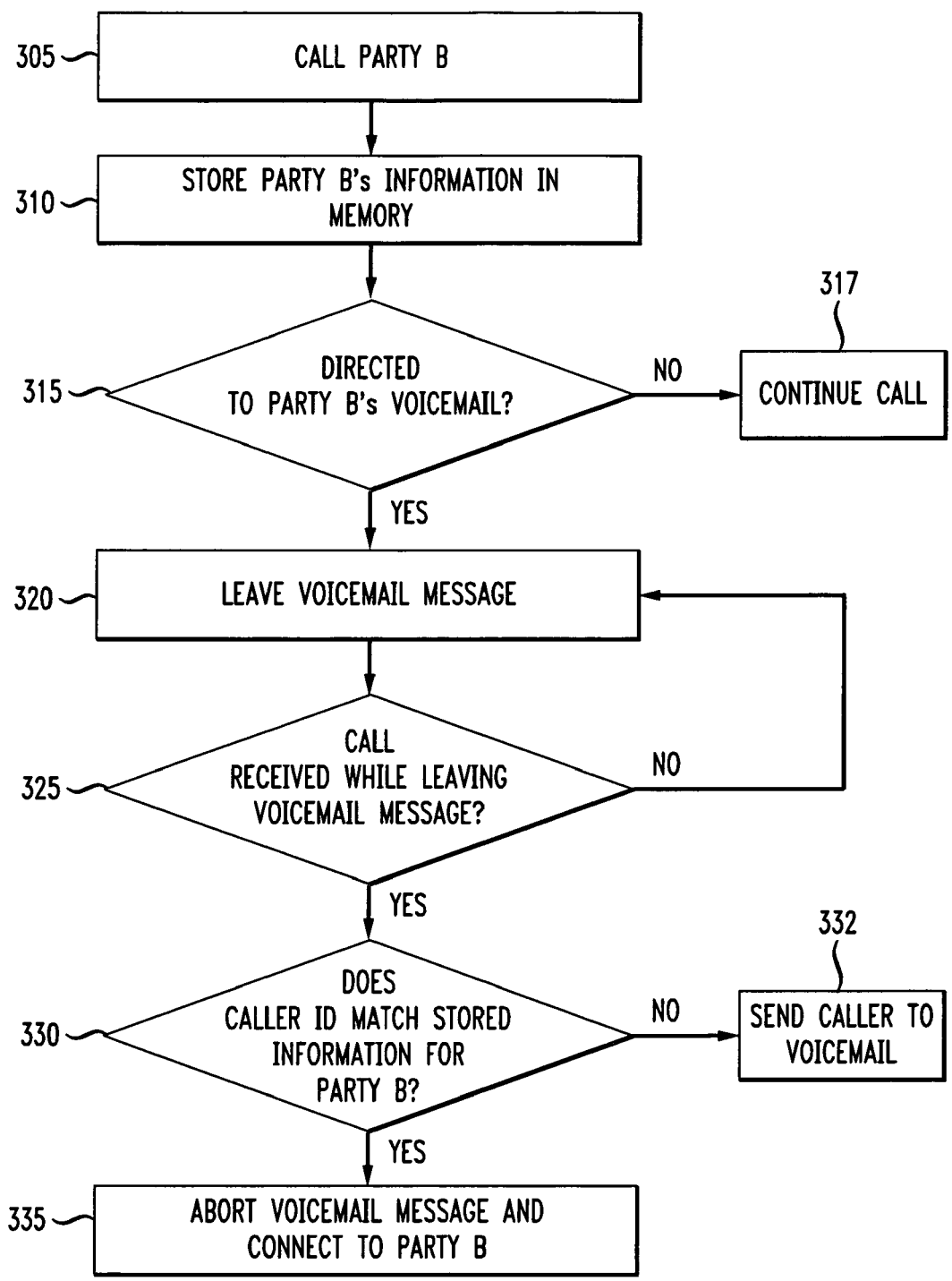
FIG. 3 shows a more detailed flowchart of steps performed by the first party to connect to the second party after the first party has been connected to the second party's voicemail in accordance with the present invention.

FIG. 3 shows a more detailed flowchart of steps performed by party A to connect to party B when party A is diverted to party B's voicemail in accordance with the present invention.

First, party A calls party B in step 305. As part of this initial call, party A's telephone (and/or telephone service provider) stores party B's information, such as party B's telephone number, in memory in step 310. Party A's telephone or telephone service provider (or a node in the telephone network) then determines, in step 315, whether party A has been directed to party B's voicemail. If not, the call continues in step 317.

If party A has been directed to party B's voicemail in step 315, then party A typically leaves a voicemail message in step 320. While party A is leaving a voicemail message on party B's voicemail, party A's telephone or telephone service provider (or a node) checks whether a call is received in step 325. If not, then party A continues to leave a voicemail message in step 320.

If a call is received in step 325, party A's telephone service provider (or node) then determines in step 330 whether the caller ID of the incoming call matches the information stored in step 310 for party B. During this time, party B may be directed to party A's voicemail (i.e., crossing voicemail messages), may receive a busy signal, or may not receive an answer to the call.

If the caller ID does not match the stored information for party B in step 330, party B is diverted to (or continues the message in) voicemail in step 332. If the caller ID of the incoming call matches the information stored in step 310 for party B, the voicemail message being left by party A (and/or party B) is aborted and party A is connected to party B in step 335.

In one embodiment, a subscriber of the service described above can enable or disable the service for their account, for instance, initially when the subscriber signs up with the telephone service provider or anytime thereafter (e.g., by calling the telephone service provider).

In one embodiment, the service plays an announcement to the party (e.g., party B) that made a call back to the previous caller (e.g., party A). The announcement can be, for example, "You are being joined to the person that you were calling," before party A is joined with party B.

Figure 4:
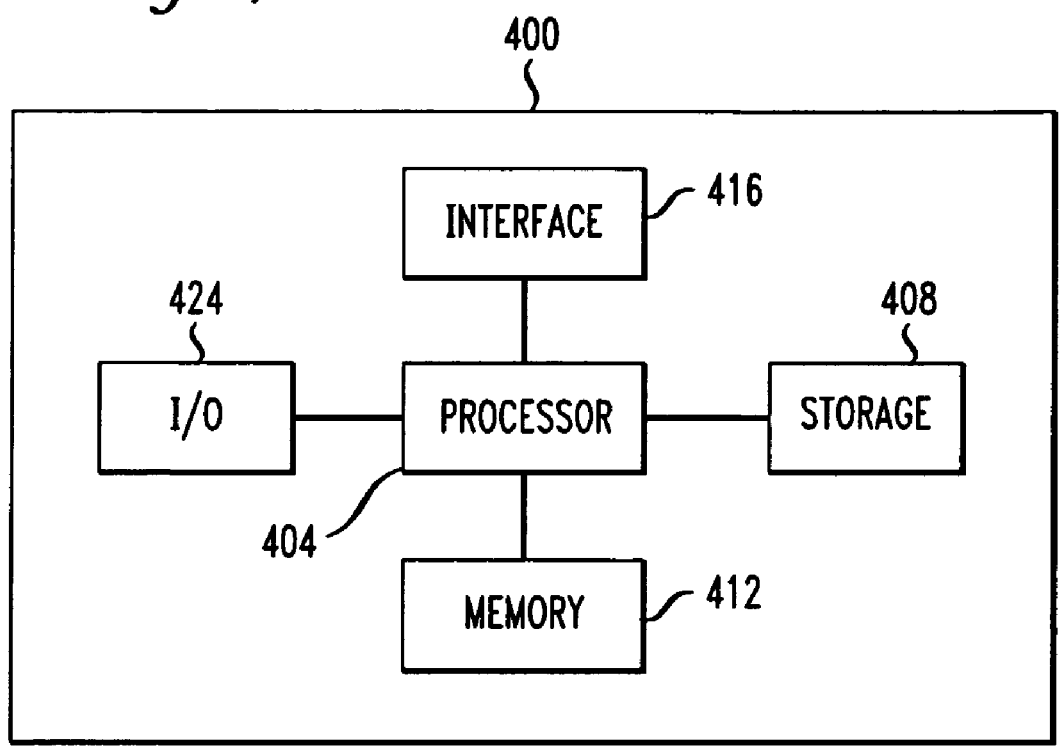
FIG. 4 shows a high level block diagram of a computer system which may be used in an embodiment of the invention.

The previous description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other nodes. A high level block diagram of such a computer is shown in FIG. 4. Computer 400 contains a processor 404 which controls the overall operation of computer 400 by executing computer program instructions which define such operation. The computer program instructions may be stored in a storage device 408 (e.g., magnetic disk) and loaded into memory 412 when execution of the computer program instructions is desired. Computer 400 also includes one or more interfaces 416 for communicating with other devices (e.g., locally or via a network). Computer 400 also includes input/output 424 which represents devices which allow for user interaction with the computer 400 (e.g., display, keyboard, mouse, speakers, buttons, etc.). In one embodiment, computer 400 represents a node (e.g., an application server) in a telephony network (e.g., a VoIP network). One skilled in the art will recognize that an implementation of an actual computer will contain other nodes as well, and that FIG. 4 is a high level representation of some of the nodes of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for enabling communication between a first party and a second party comprising:
   determining that the second party is calling the first party while the first party is leaving a first voicemail message for the second party by matching call identifier information identifying the second party with stored information indicating a telephone number that was previously called by the first party;
   determining that the second party is leaving a second voicemail message for the first party;
   aborting the first voicemail message and the second voicemail message; and
   connecting the second party with the first party to enable direct communication between the second party and the first party.

2. The method of claim 1 further comprising storing the information indicating a telephone number that was previously called by the first party.

3. The method of claim 2 wherein the call identifier information further comprises a telephone number associated with the second party.

4. The method of claim 1 further comprising directing a call from the first party to the second party before the first party is leaving the first voicemail message for the second party.

5. The method of claim 1 wherein the aborting step further comprises erasing the first voicemail message and the second voicemail message.

6. A network node configured to enable communications between a first party and a second party comprising:
   means for determining the second party is calling the first party while the first party is leaving a first voicemail message for the second party by matching call identifier information identifying the second party with stored information indicating a telephone number that was previously called by the first party;
   means for determining that the second party is leaving a second voicemail message for the first party;
   means for aborting the first voicemail message and the second voicemail message; and
   means for connecting the second party with the first party to enable direct communication between the second party and the first party.

7. The network node of claim 6 further comprising means for storing the information indicating a telephone number that was previously called by the first party.

8. The network node of claim 7 wherein the call identifier information further comprises a telephone number associated with the second party.

9. The network node of claim 6 further comprising means for directing a call from the first party to the second party before the first party is leaving the first voicemail message for the second party.

10. The network node of claim 6 wherein the means for aborting further comprises means for erasing the first voicemail message and the second voicemail message.

* * * * *